United States Patent [19]

Inaba et al.

[11] Patent Number: 4,878,740
[45] Date of Patent: Nov. 7, 1989

[54] LIQUID CRYSTAL DEVICE

[75] Inventors: Yutaka Inaba, Kawaguchi; Osamu Taniguchi, Chigasaki, both of Japan

[73] Assignee: Canon Kabushiki Kaisha, Tokyo, Japan

[21] Appl. No.: 56,646

[22] Filed: Jun. 2, 1987

[30] Foreign Application Priority Data

Jun. 3, 1986 [JP] Japan .................. 61-128813

[51] Int. Cl.$^4$ .............................................. G02F 1/13
[52] U.S. Cl. .................................. 350/337; 350/350 S
[58] Field of Search ........... 350/350 S, 347 V, 347 E, 350/352, 337, 334, 331 R

[56] References Cited

U.S. PATENT DOCUMENTS 4,367,924  1/1983  Clark et al. ................... 350/350 S
4,634,226  1/1987  Isogai et al. ................... 350/350 S Primary Examiner—Stanley D. Miller
Assistant Examiner—Anita E. Pellman
Attorney, Agent, or Firm—Fitzpatrick, Cella, Harper & Scinto

[57] ABSTRACT

A liquid crystal cell includes a pair of substrates, and a ferroelectric liquid crystal assuming a first and a second orientation state in response to an electric field applied thereto. The liquid crystal cell is combined with an optical detector including a polarizer and an analyzer to form a liquid crystal device. The absorption (or transmission) axes of the polarizer and the analyzer are disposed to intersect each other and are deviated from the optic axis providing the darkest or brightest state of the liquid crystal device.

13 Claims, 12 Drawing Sheets

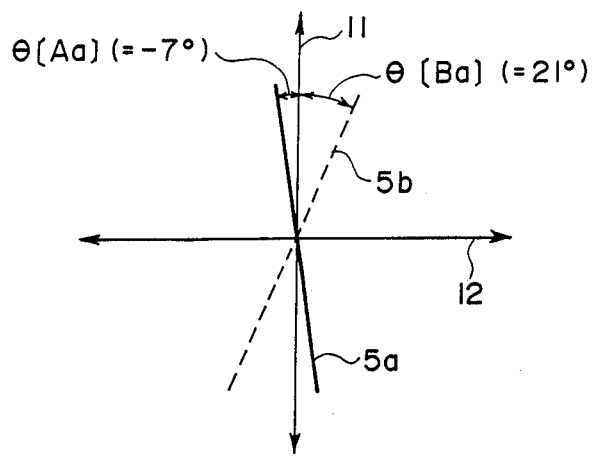
F I G. 1A
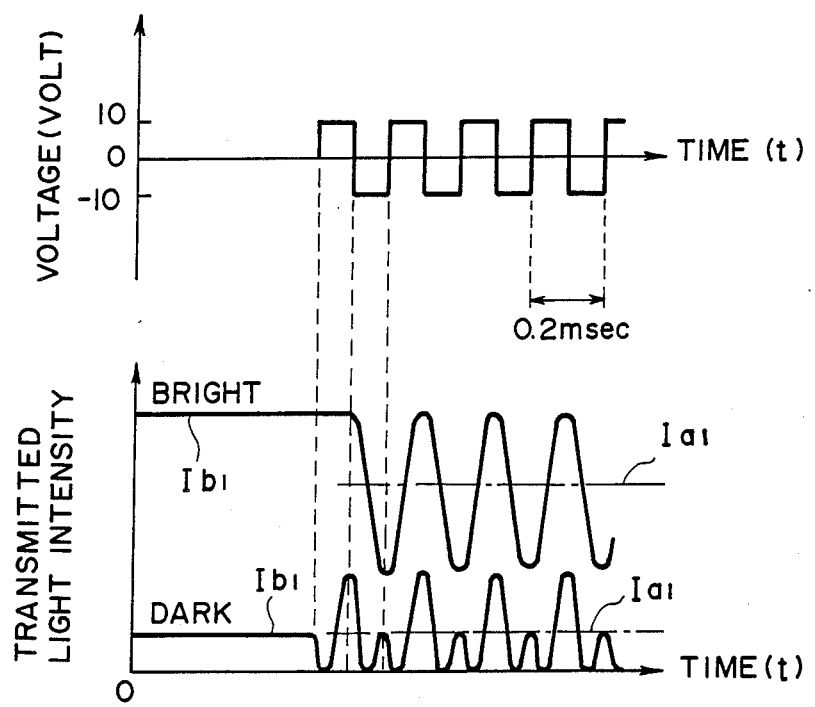
F I G. 1B

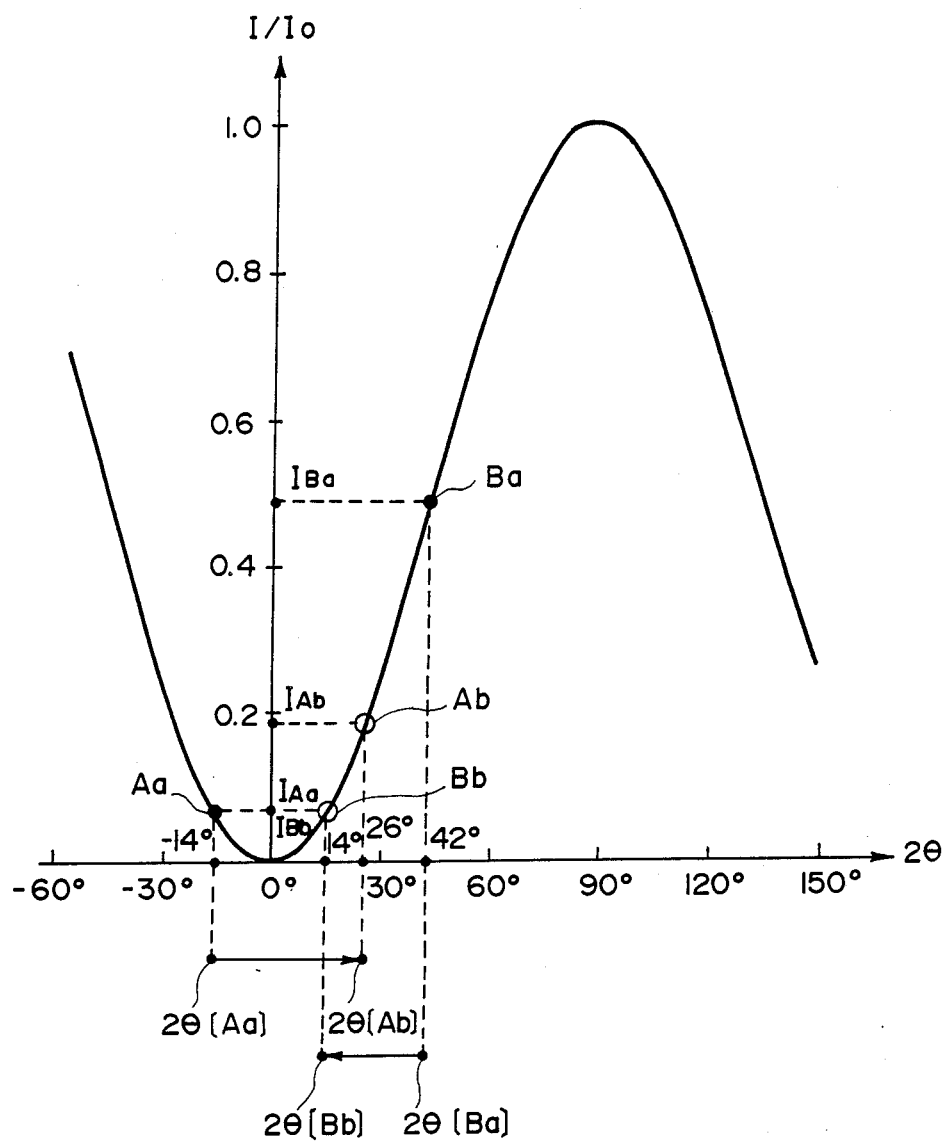
F I G. 2

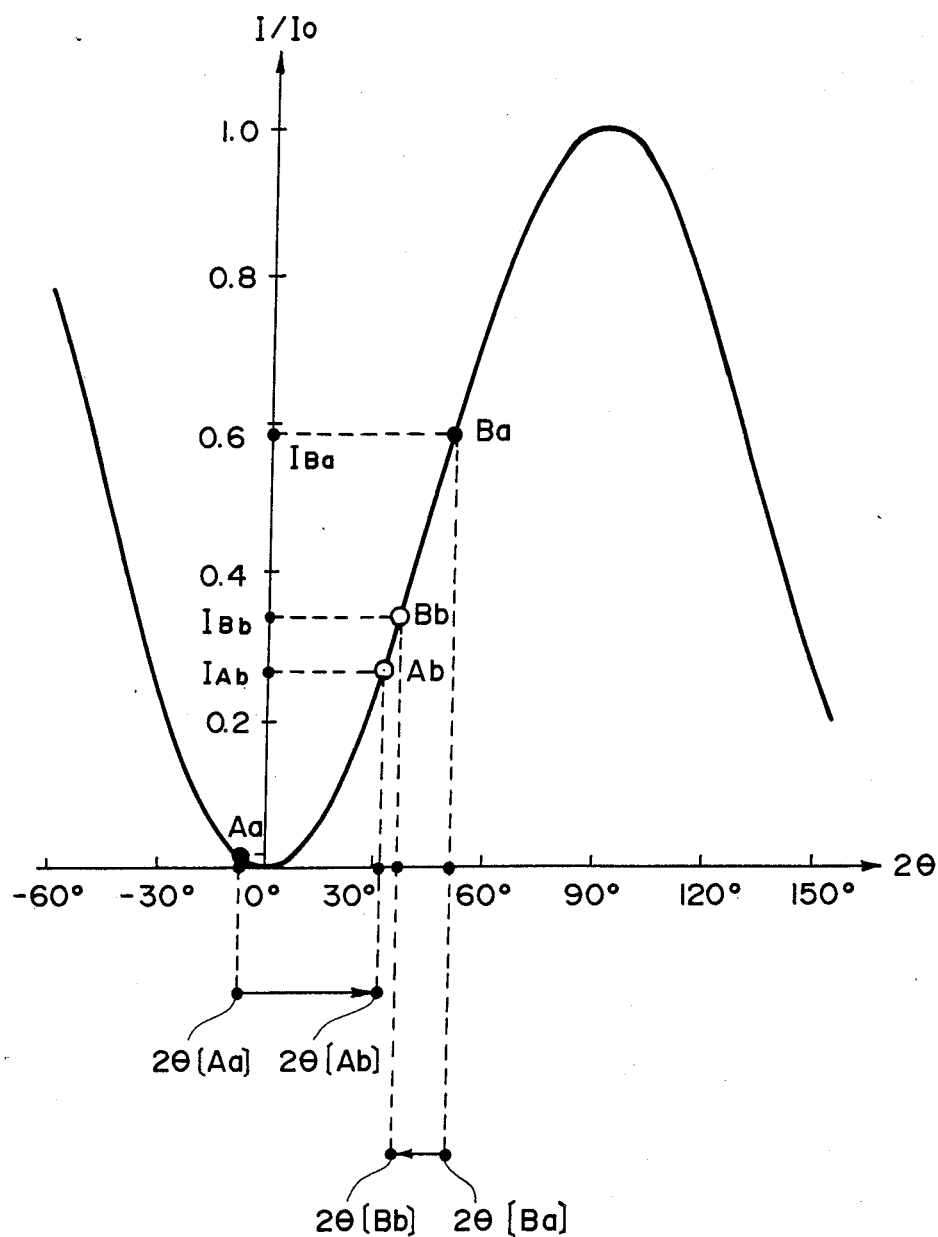
F I G. 6

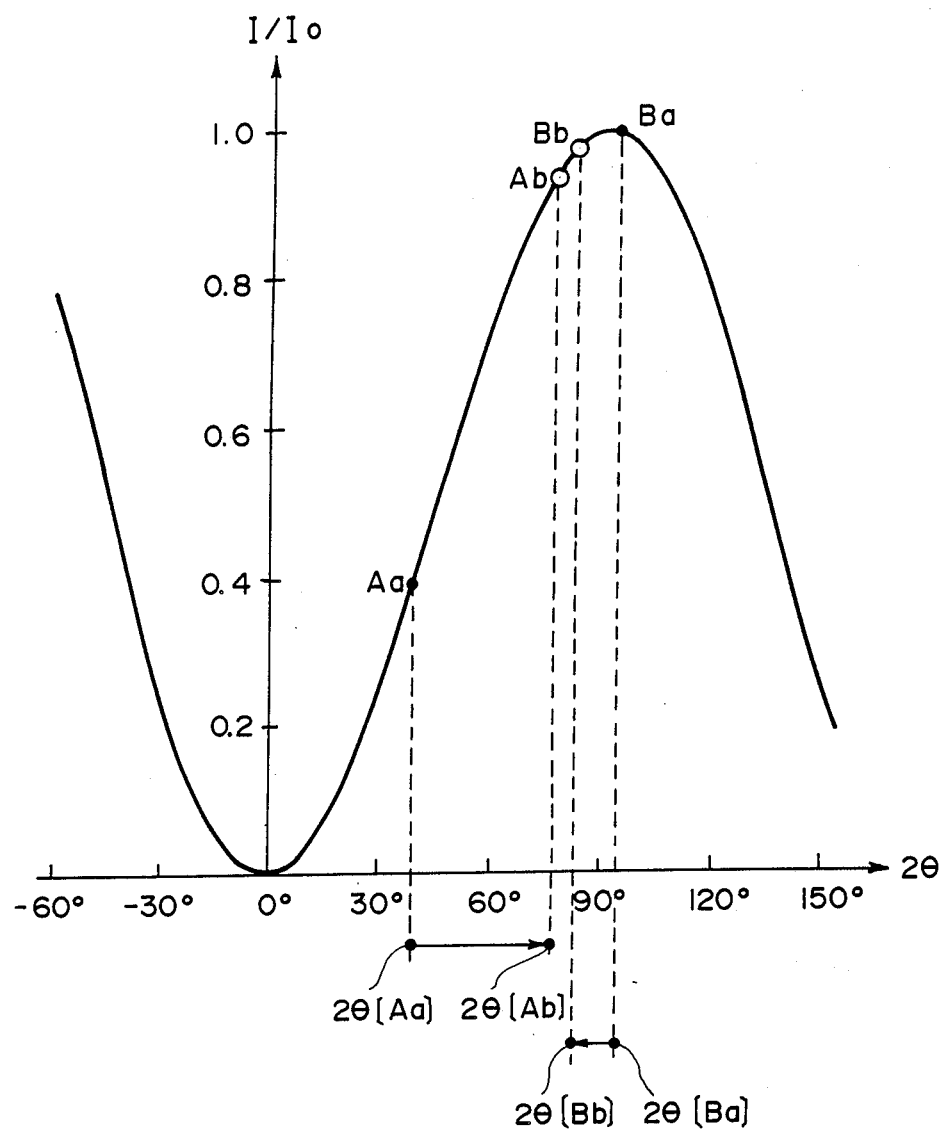
F I G. 7

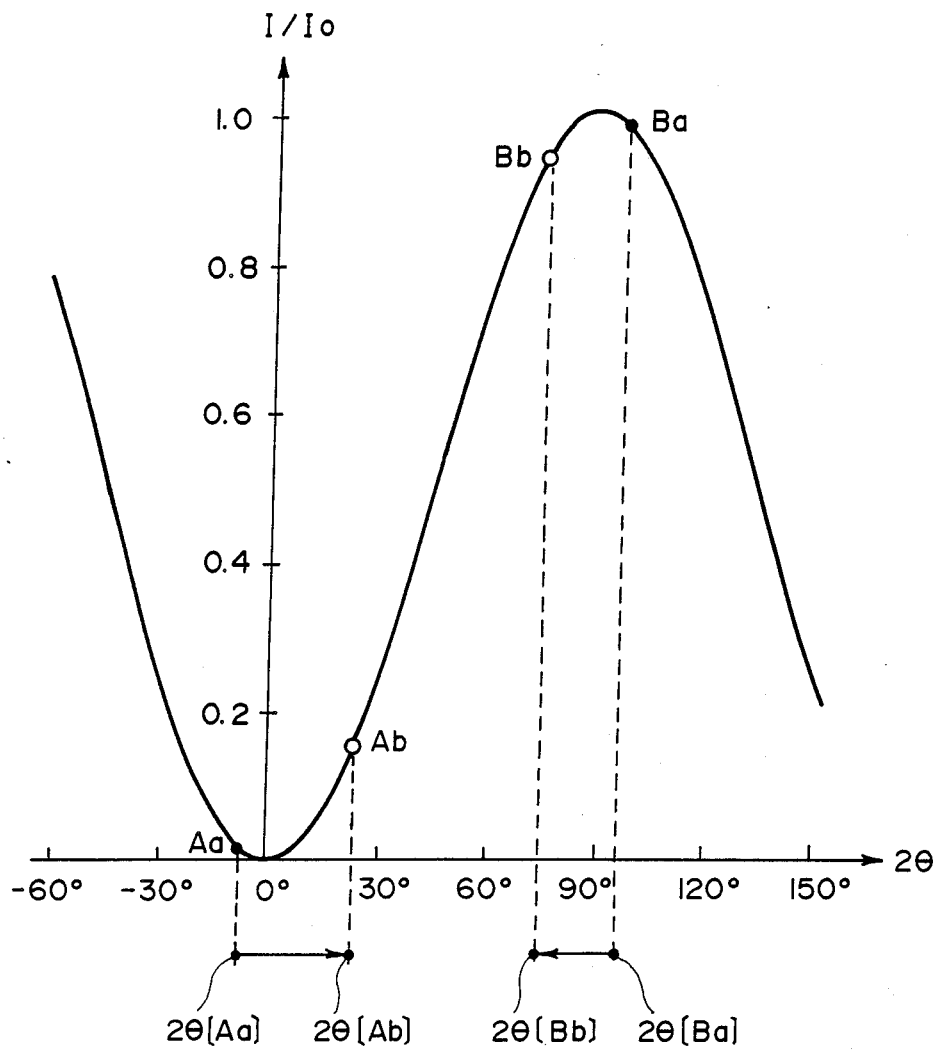
F I G. 8

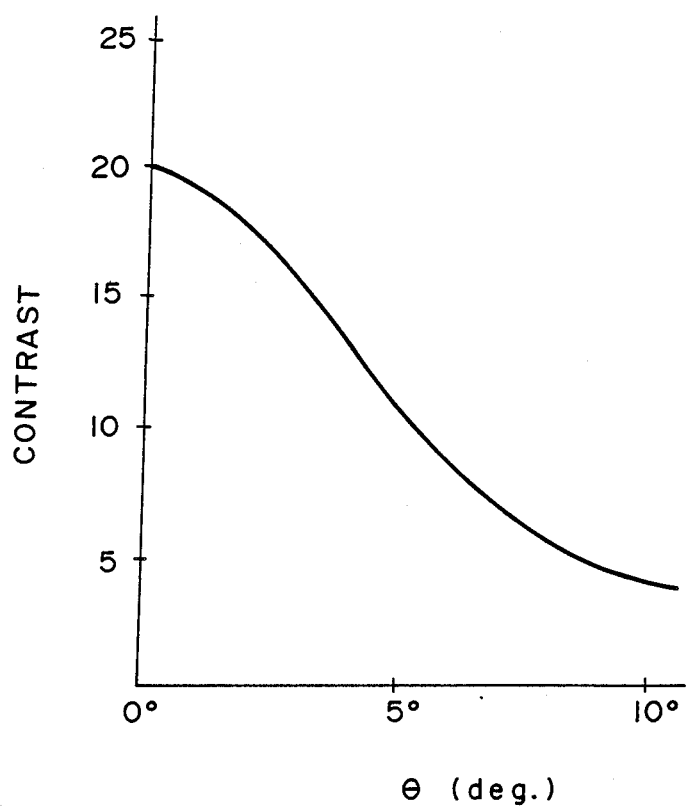
F I G. 9

LIQUID CRYSTAL DEVICE

FIELD OF THE INVENTION AND RELATED ART

The present invention relates to an optical modulation device and particularly to a ferroelectric liquid crystal device showing bistability capable of providing optically discriminable first and second states.

In recent years, research and development of ferroelectric liquid crystal devices are extensively conducted in place of TN-type liquid crystal devices. As disclosed in U.S. Pat. Nos. 4,367,924, and 4,548,476, Japanese Patent Laid-Open Application No. 33535/1985 (corr. to U.S. Ser. No. 598,800), ditto 156046/1985 and 156047/1985 (corr. to U.S. Ser. No. 691,761), ditto 172029/1985 (corr. to U.S. Ser. No. 701,765), the ferroelectric liquid crystal has advantages, such as (1) a memory characteristic, (2) a high response speed, and (3) a wide viewing angle.

While the ferroelectric liquid crystal device has advantages as described above, however, it still has some problems. More specifically, when a ferroelectric liquid crystal is supplied with an AC voltage below its threshold, molecules of the ferroelectric liquid crystal cause "fluctuation" though not shifted from one stable state to the other stable state, whereby change in optical characteristic based on such "fluctuation" causes flickering on a display face.

The problem will be further explained hereinbelow.

FIG. 12A is a plan view of ferroelectric liquid crystal molecules under a bistability condition as shown in FIG. 11 which will be described hereinafter and shows a state where a ferroelectric liquid crystal molecule $5a$ in one orientation state is shifted through an angle $\text{\textcircled{H}}$ to the other orientation state under the action of an electric field exceeding the threshold. The transmitted light quantity I of the ferroelectric liquid crystal when it is sandwiched between two polarizers having absorption axis (or transmission axis) $11a$ and $12a$ crossing each other at right angles is expressed by the following equation (Incidentally, the term "absorption axis" used hereinafter has the same meaning as "absorption axis (or transmission axis)"):

$$I = I_0 \sin^2 2\theta \cdot \sin^2(\pi \cdot \Delta n \cdot d/\lambda) \quad (1)$$

wherein $I_O$ denotes an incident light quantity, $\theta$ is an angle between the average molecular axis of liquid crystal molecules and the absorption axis of one polarizer, $\Delta n$ is a refractive index anisotropy, d is a liquid crystal layer thickness (cell thickness), and $\lambda$ is the wavelength of the incident light.

Accordingly, the darkest state is attained when the average molecular axis of the ferroelectric liquid crystal molecules coincides with one polarization axis, and the brightest state is attained when the average molecular axis of the liquid crystal molecules forms an angle of 45° with one absorption axis.

As is described hereinafter, a ferroelectric liquid crystal molecule under a bistability condition is invertedly shifted from a first stable position to a second stable position when placed under an electric field exceeding a certain threshold voltage and is invertedly shifted from the second stable position to the first stable position in response to an electric field of the reverse polarity. However, it has been experimentally found that a ferroelectric liquid crystal molecule changes its position to some extent (though it does not cause the above mentioned inversion shift) also in response to an electric field below the threshold. FIG. 12B clarifies therefor and shows a change in transmitted light intensity based on a positional change when a voltage pulse of ±10 V and 0.2 m.sec, which was about one third of the threshold, was applied. As is understood from FIG. 12B, the molecule $5a$ in the first orientation state, (dark state) providing a small $Ib_1$(transmitted light intensity under no electric field), increased the transmitted light intensity to some extent in response to an electric field in a positive direction and changed the transmitted light intensity to a small extent in response an electric field in a negative direction. In contrast thereto, the molecule $5b$ providing a large $Ib_1$ changed little the transmitted light intensity in response to a positive electric field and changed the transmitted light intensity to some extent in response to a negative electric field. In other words, a liquid crystal molecule in one orientation state changed its position to some extent in response to an electric field below the threshold of the same polarity as a pulse causing an inversion from the one orientation state to the other orientation state and correspondingly caused the change in transmitted light intensity given by the equation (1). FIG. 13 is a view illustrating the angle range in which a molecule moves and a corresponding change in transmitted light intensity. In the figure, the abscissa represents an angle $2\theta$ which is twice the angle $\theta$ between the average molecular axis and the absorption axis of one polarizer, and the ordinate represents the transmitted light intensity ($I/I_O$) given by the equation (1) Stable positions under no electric field are denoted by Aa (first orientation state) and Ba (second orientation state), and the ranges of movement under the application of an electric field ($\frac{1}{3}$ of the threshold) are given by Aa→Ab and Ba→Bb. Corresponding to the molecular movement, the transmitted light intensity changed from $I_{Aa}(=0) \to I_{Ab}$ in the case of the first orientation state or changed from $I_{Ba} \to I_{Bb}$ in the case of the second orientation state. In this instance, the $\theta$ values corresponding to $I_{Aa}$, $I_{Ab}$, $I_{Ba}$ and $I_{Bb}$ were $\theta[Aa]=0°$, $\theta[Ab]=20°$, $\theta[Ba]=28°$ and $\theta[Bb]=14°$.

In the actual application of a ferroelectric liquid crystal to a display, a multiplex or matrix driving method as disclosed in Japanese Laid-Open Patent Applications Nos. 33535/1985 (corr. to U.S. Ser. No. 598,800), 156046/1985 and 156047/1985 (corr. to U.S. Ser. No. 691,761) may be used. In such driving methods, a pixel at the time of nonselection is designed to be supplied with an alternating voltage (e.g., an AC voltage) below the threshold.

As a result, a pixel at the time of nonselection causes a change in transmitted light intensity therethrough depending on the alternating voltage applied below the threshold. The change in transmitted light intensity causes flickering on a display screen. Further, in a ferroelectric liquid crystal device having a memory characteristic under the above mentioned bistability condition, unlike the CRT or TN-liquid crystal device, it is not necessary to always refresh the screen but it is more advantageous in view of power consumption an life of the device to effect, e.g., a line-sequential scanning for writing only when a rewriting operation becomes necessary and to hold a displayed picture under no voltage application when no rewriting is required. However, in this mode of operation, the transmitted light intensity of the whole picture can change between the time of scanning for writing and the time of holding. Further, when a rewriting operation is frequently conducted, flickering is caused on the whole picture to provide an uneasy-to-see picture and causes eye fatigue.

SUMMARY OF THE INVENTION

Accordingly, an object of the present invention is to solve the above mentioned problems, particularly to provide an optical modulation device, especially a ferroelectric liquid crystal device, free of flickering on the picture.

According to a first aspect of the present invention, there is provided a liquid crystal device, comprising: a liquid crystal cell comprising a pair of substrates, and a ferroelectric liquid crystal assuming a first and a second orientation state in response to an electric field applied thereto disposed between the substrates, and optical detection means; wherein the liquid crystal device provides a time-average transmitted light intensity therethrough in either one orientation state under the application of an alternating electric field with a time-average of zero not causing transition between the first and second orientation states, the time-averate transmitted light intensity being substantially equal to the transmitted light intensity in the orientation state concerned under no electric field. The difference should preferably be suppressed within the range of ±10% of the difference between the maximum transmitted light intensity and the minimum transmitted light intensity so as not to leave flickering at a level noticeable to eyes.

According to a second aspect of the present invention, there is provided a liquid crystal device, comprising: a liquid crystal cell comprising a pair of substrates, and a ferroelectric liquid crystal assuming a first and a second orientation state in response to an electric field applied thereto disposed between the substrates, and optical detection means; wherein the liquid crystal device satisfies the following relations:

$$\Delta I_1 = |Ia_1 - Ib_1| < \Delta I_2 = |Ia_2 - Ib_2|,$$

wherein $Ia_1$ denotes a time-average transmitted light intensity in either one orientation state under the application of an alternating electric field with a time average of zero not causing transition between the first and second orientation states; $Ib_1$ denotes a transmitted light intensity in the orientation state under no electric field; $Ia_2$ denotes a time-average transmitted light intensity in the darkest or brightest state under the application of the alternating electric field; and $Ib_2$ denotes a transmitted light intensity in the darkest or brightest state under no electric field.

According to a third aspect of the present invention, there is provided a liquid crystal device, comprising: a liquid crystal cell comprising a pair of substrates, and a ferroelectric liquid crystal assuming a first and a second orientation state in response to an electric field applied thereto disposed between the substrates, and optical detection means comprising a polarizer and an analyzer; wherein the absorption (or transmission) axes of the polarizer and the analyzer are disposed to intersect each other and are deviated from the optic axis providing the darkest or brightest state of the liquid crystal device. The deviation of the angle should preferably be selected from the range of 2° to the tilt angle, preferably 4.5° to the tilt angle, so as to suppress flickering to a level not noticeable to eyes.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a plan view schematically illustrating an optical modulation device of the present invention; FIG. 1B is an explanatory view showing the optical response characteristics resultant when the device is supplied with an AC voltage below the threshold;

FIGS. 2 and 3 are explanatory views each showing a positional relationship between a molecular axis and an absorption axis, and a relationship between a range for molecular axis movement and a transmitted light intensity when the device shown in FIG. 1 is used.

FIGS. 6, 7 and 8 are explanatory views each showing a positional relationship between a molecular axis and an absorption axis, and a relationship between a range for molecular axis movement and a transmitted light intensity;

FIG. 9 is an explanatory view showing a relationship between a contrast and an angle $\theta$;

DETAILED DESCRIPTION OF THE PREFERRED EMBODIMENTS

Figure 10:
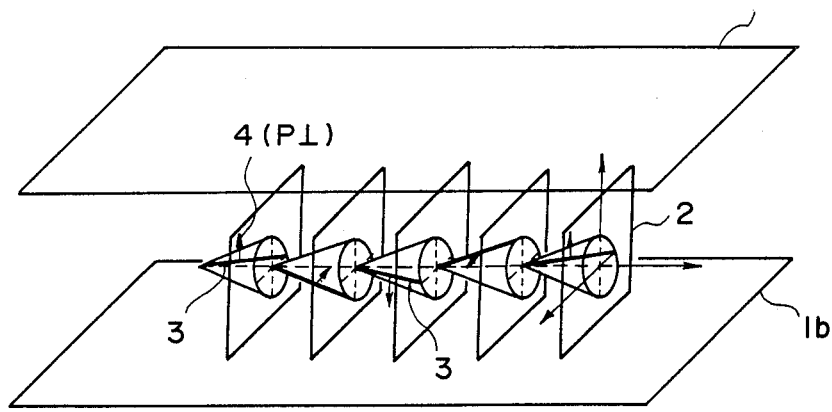
FIG. 10 is a perspective view schematically showing a ferroelectric liquid crystal device.
Figure 11:
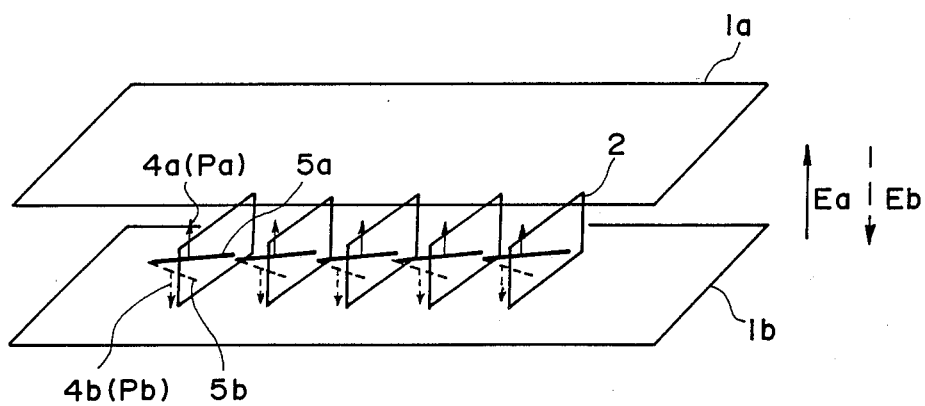
FIG. 11 is a perspective view schematically illustrating a ferroelectric liquid crystal device a under bistability condition used in the present invention.

Referring to FIG. 10, there is schematically shown an example of a ferroelectric liquid crystal cell for explanation of the operation thereof. Reference numerals 1a and 1b denote substrates (glass plates) on which a transparent electrode of, e.g., $In_2O_3$, $SnO_2$, ITO (Indium-Tin-Oxide), etc., is disposed, respectively. A liquid crystal of, e.g., an SmC*-phase in which liquid crystal molecular layers 2 are oriented perpendicularly to surfaces of the substrates is hermetically disposed therebetween. Full lines 3 show liquid crystal molecules. Each liquid crystal molecule 3 has a dipole moment ($P_\perp$) 4 in a direction perpendicular to the axis thereof. When a voltage higher than a certain threshold level is applied between electrodes formed on the substrates 1a and 1b, a helical structure of the liquid crystal molecule 3 is unwound or released to change the alignment direction of respective liquid crystal molecule 3 so that the dipole moment ($P_\perp$) 4 are all directed in the direction of the electric field. The liquid crystal molecules 3 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, whose optical characteristics vary depending upon the polarity of an applied voltage. Further, when the thickness of the liquid crystal cell is sufficiently thin (e.g, 1 $\mu$), the helical structure of the liquid crystal molecules is unwound to form a nonhelical structure even in the absence of an electric field whereby the dipole moment assumes either of the two states, i.e., Pa in an upper direction 4a or Pb in a lower direction 4b as shown in FIG. 11. When an electric field Ea or Eb higher than a certain threshold level and different from each other in polarity as shown in FIG. 11 is applied to a cell having the above-mentioned characteristics, the dipole moment is directed either in the upper direction 4a or in the lower direction 4b depending on the vector of the electric field Ea o Eb. In correspondence with this, the liquid crystal molecules are oriented in either of a first orientation state 5a and a second orientation state 5b.

When the above-mentioned ferroelectric liquid crystal is used as an optical modulation element, it is possible to obtain two advantages. First, the response speed is quite fast. Second, orientation of the liquid crystal shows bistability. The second advantage will be further explained, e.g., with reference to FIG. 11. When the electric field Ea is applied to the liquid crystal molecules, they are oriented in the first orientation state 5a. This state is stably retained even if the electric field is removed. On the other hand, when the electric field Eb of the opposite direction is applied thereto, the liquid crystal molecules are oriented to the second orientation state 5b, whereby the directions of the molecules are changed. This state is similarly stably retained even if the electric field is removed. Further, as long as the magnitude of the electric field Ea or Eb being applied is not above a certain threshold value, the liquid crystal molecules are placed in the respective orientation states. In order to realize such an alignment state capable of providing at least two stable states, it is preferable that the thickness of the cell is as thin as possible and generally 0.5 to 20$\mu$, particularly 1 to 5$\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

In the present invention, in addition to the above-mentioned SmC* and SmH*, ferroelectric liquid crystals in chiral smectic I phase (SmI*), J phase (SmJ*), K phase (SmK*), G phase (SmG*) or F phase (SmF*) may also be used.

More specifically, examples of the ferroelectric liquid crystal which may be used in the liquid crystal device of the present invention may include: p-decyloxybenzylidene-p'-amino-2-methylbutylcinnamate (DOBAMBC), p-hexyloxybenzylidene-p'-amino-2-chloropropylcinnamate (HOBACPC), p-decyloxy-benzylidene-p'-amino-2-methylbutyl-$\alpha$-cyanocinnamate (DOBAMBCC), p-tetradecyloxybenzylidene-p'-amino-2-methylbutyl-$\alpha$-cyanocinnamate (TDOBAMBCC), p-octyloxy-benzylidene-p'-amino-2-methylbutyl-$\alpha$-chlorocinnamate (OOBAMBCC), p-octyloxybenzylidene-p'-amino-2-methylbutyl-$\alpha$-methylcinnamate, 4,4'-azoxycinnamic acid-bis(2-methylbutyl)-ester, 4-O-(2-methyl)butylresorcylidene-4'-octylaniline (MBRA 8), 4-(2'-methylbutyl)phenyl-4'-octyloxybiphenyl-4-carboxylate, 4-hexyloxyphenyl-4-(2''-methylbutyl)biphenyl-4'-carboxylate, 4-octyloxyphenyl-4-(2''-methylbutyl)biphenyl-4'-carboxylate, 4-heptylphenyl-4-(4''-methylhexyl)biphenyl-4'-carboxylate, and 4-(2''-methylbutyl)phenyl-4-(4''-methylhexyl)biphenyl-4'-carboxylate. These compounds may be used singly or in combination of two or more species thereof, or further can be used in a mixture with another nonferroelectric liquid crystal, such as a cholesteric (chiral nematic) liquid crystal or a smectic liquid crystal as far as the ferroelectricity is retained.

FIG. 1A illustrates an embodiment of the present invention and shows the positional relationship among a liquid crystal molecule 5a disposed at a position $\theta[Aa]$ of a first orientation state, a liquid crystal molecule 5b disposed at a position $\theta[Ba]$ of a second orientation state, and absorption axes 11 and 12 of a pair of polarizers (polarizer and analyzer). FIG. 1B shows an optical response characteristic of the liquid crystal device placed in the relative positions shown in FIG. 1A when supplied with AC rectangular pulses with a frequency of 5 KHz and a peak value of $\pm 10$ V which are below the threshold.

Figure 13:
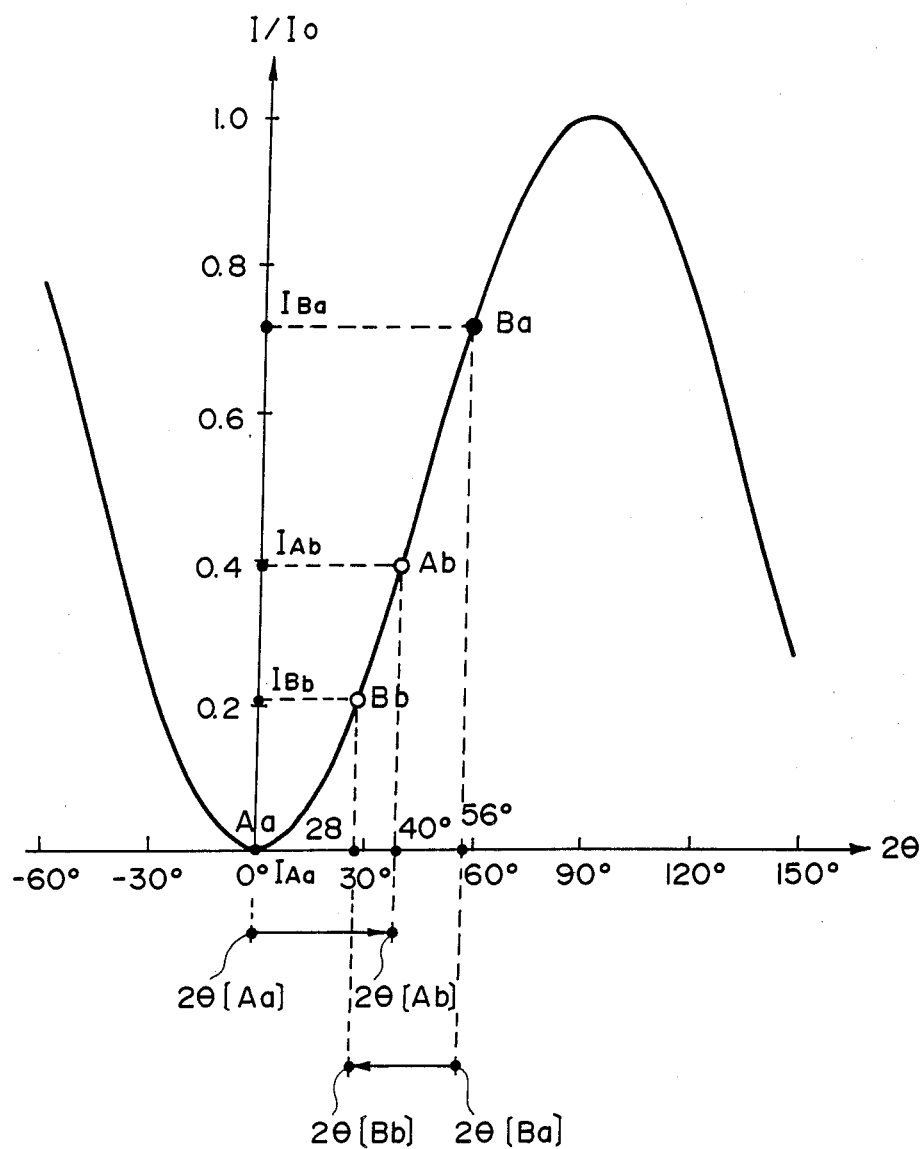
FIG. 13 is an explanatory view showing a positional relationship between a molecular axis and an absorption axis, and a relationship between a range for molecular axis movement and a transmitted light intensity when the device shown in FIG. 12 outside the invention is used.

FIG. 2 is a view, similar to FIG. 13, showing an angle range of a molecular movement and a corresponding change in transmitted light intensity. Also in FIG. 2, the stable positions under no electric field are denoted by Aa (position of first orientation state) and Ba (position of second orientation state), and the ranges of movement of molecules under the application of an electric field (a pulse with a frequency of 5 KHz and a peak value of $\pm 10$ V, which is $\frac{1}{3}$ of the threshold) are given by Aa→Ab, and Ba→Bb. In this embodiment, the angles $\theta$ were $\theta[Aa]=-7°$, $\theta[Ab]=13°$, $\theta[Ba]=21°$ and $\theta[Ba]=7°$. In other words, in this embodiment, the absorption axes 11a and 12a were respectively rotated by $-7°$. In this way, at the position $\theta[Aa]$ in the first orientation state (dark state), the liquid crystal molecular axis 5a and the absorption axis 11 do not coincide with each other or are deviated from each other, and the transmitted light intensity is not zero. Further, the molecular axis 5a moves from Aa→Ab under the voltage application, and at this time, the molecular axis 5a moves across the absorption axis 11 ($\theta=0$). As a result, the transmitted light intensity decreases once and then increases in response to a positive electric field and reverses again in response to a negative electric field.

We have observed the transmitted light in the dark state both at the time of no electric field and at the time of the application of an alternating electric field with a time-average voltage of zero. As a result, it has been found that if the average transmitted light intensity (time average of transmitted light intensity) is almost or nearly equal to the transmitted light intensity under no electric field, almost no flickering is noticeable regardless of the presence or absence of the electric field. The angle $\theta[Aa]=-7°$ is an angle which was set in this manner.

Figure 3:
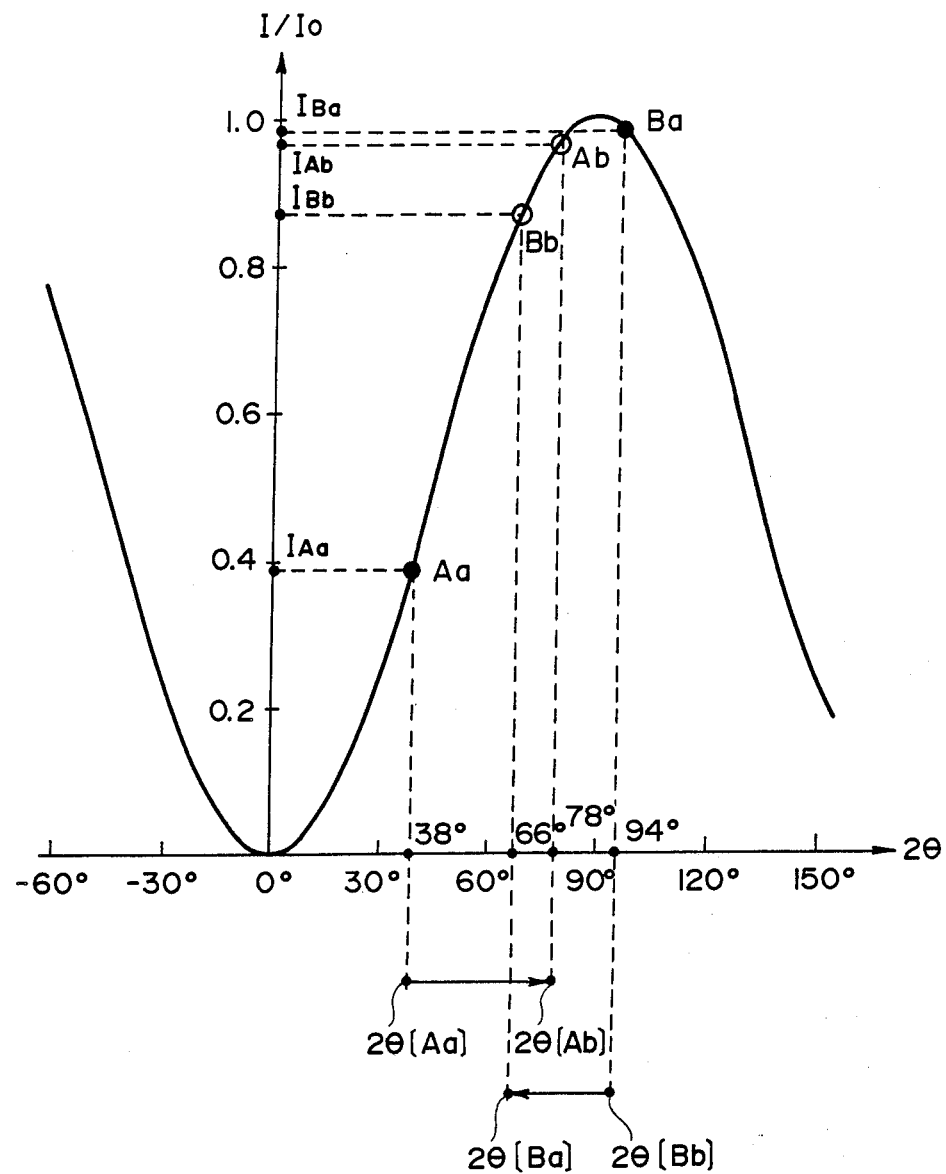

With respect to the position $\theta[Ba]$ in the bright position, the average transmitted light intensity is not equal to the transmitted light intensity under no electric field. However, it is of course possible to suppress the change in transmitted light intensity to nearly zero by setting the angle between the liquid crystal molecular axis and the polarization axis to an appropriate value other than the above. FIG. 3 shows such an embodiment. In the embodiment of FIG. 3, the following values are adopted: $\theta[Aa]=19°$, $\theta[Ab]=39°$, $\theta[Ba]=47°$ and $\theta[Bb]=33°$. In this instance, the change in transmitted light intensity in the dark state is suppressed to zero. According to our experiments, the flickering on the display picture was best suppressed when the change in transmitted light intensity on the dark state side and was much better than when it was effected on the bright state side.

Figure 4:
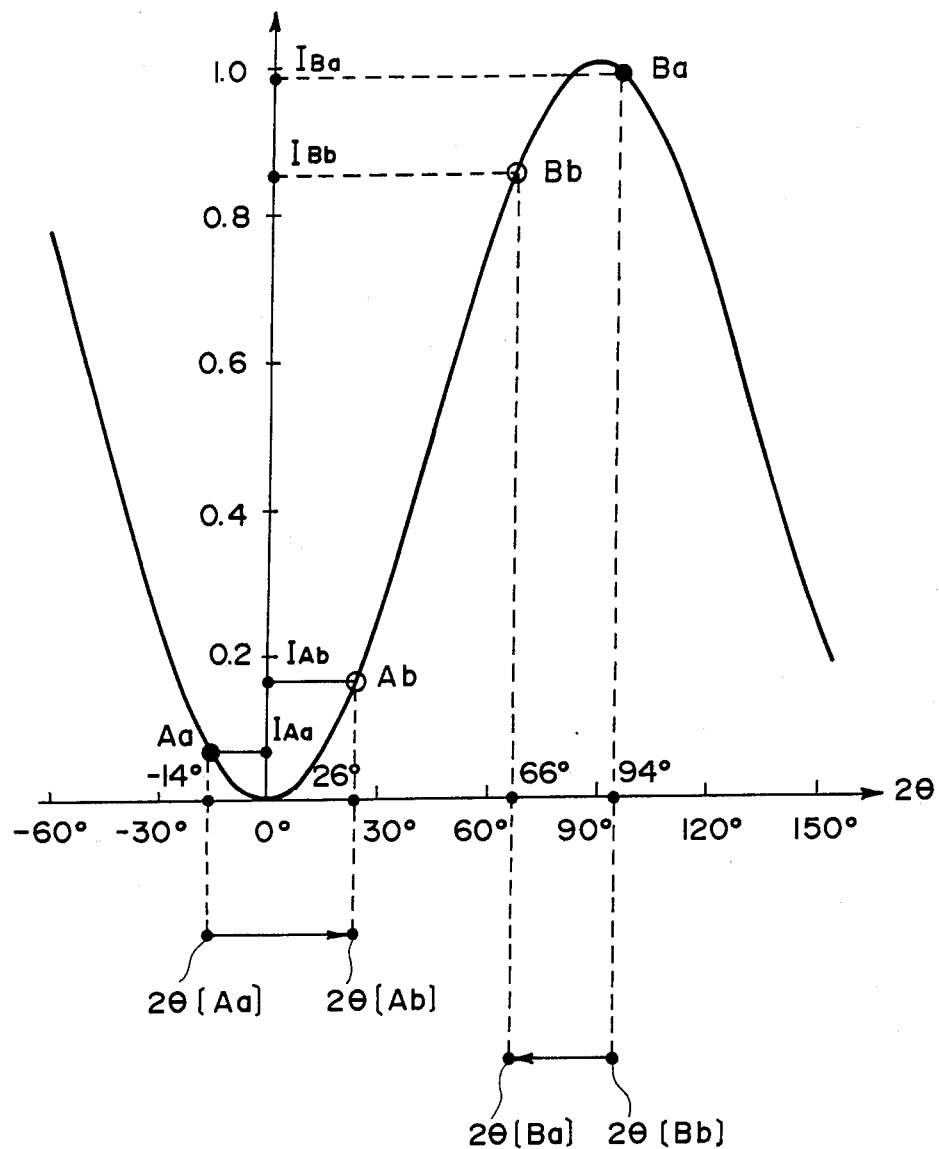
FIG. 4 is an explanatory view showing a positional relationship between a molecular axis and an absorption axis, and a relationship between a range for molecular axis movement and a transmitted light intensity when another preferred embodiment of the present invention is used.

In another preferred embodiment of the present invention, a ferroelectric liquid crystal having a tilt angle under bistability condition $((\theta[Ba]-\theta[Aa])/2)$ which is larger than that of the above example $((\theta[Ba]-\theta[Aa])/2=(21°-(-7°))/2=14°)$ is used and the absorption axis 11 is disposed at a position between a molecular axis $5a$ at the position $\theta[Aa]$ of the first orientation state and a molecular axis $5a$ at the position $\theta[Ba]$ of the second orientation, so that the average of the changing transmitted light intensity will be the same as the transmitted light intensity under no electric field on both the dark state side and the bright state side. More specifically, FIG. 4 shows an embodiment wherein a ferroelectric liquid crystal having a tilt angle of 22.5° (that is, the angle between the molecular axis $5a$ at the position $\theta[Aa]$ of the first orientation state and the molecular axis $5b$ at the position $\theta[Ba]$ of the second orientation state is 45°) is used. Similar to FIG. 8, FIG. 4 shows an angular range of molecular movement and a change in transmitted light intensity at that time. In the case of FIG. 4, the stable positions under no electric field are also denoted by the position $\theta[Aa]$ in the first orientation state and $\theta[Ba]$ in the second orientation state, and the ranges of molecular movement under application of an electric field (a pulse with a frequency of 5 KHz and a peak value of ±10 V, which is ⅓ of the threshold) are denoted by Aa→Ab and Ba→Bb.

In the embodiment of FIG. 4, a liquid crystal cell incorporating "ZLI 3232" (trade name, mfd. by Merck Co.) was used as a ferroelectric liquid crystal material, whereby the tilt angle $((\theta[Ba]-\theta[Aa])/2)$ was measured to be 27°. In this embodiment, the relative positions ($\theta[Aa]$ and $\theta[Ba]$) of the molecular axes $5a$ and $5b$ with respect to the absorption axis 11 (or 12), and the ranges of molecular axes movement ($\theta[Aa]\rightarrow\theta[Ab]$ and $\theta[Ba]\rightarrow\theta[Bb]$) were given by $\theta[Aa]=-7°$, $\theta[Ab]=13°$, $\theta[Ba]=47°$ and $\theta[Bb]=33°$. At this time, there was observed almost no change in transmitted light intensity by the application of an AC voltage of a frequency of 5 KHz and peak values of ±10 V.

In the above embodiments, the actual molecular axes $5a$ and $5b$ may be judged by detecting the positions of the darkest state and the brightest state under a pair of polarizers with their absorption axes crossing at right angles as they correspond to the optical axes.

In a case where the "fluctuation" of a molecule is relatively large when an alternating electric field is applied, where the alternating electric field has a time-average voltage of 0 not causing switching between the first and second orientation states ($\theta[Aa]$ and $\theta[Ba]$, i.e., where a flickering on a display picture is noticeable, it is necessary as described above to deviate the polarizer or analyzer from the darkest or brightest position at a large angle in order to suppress the flickering. However, such an increased angle $\theta$ results in a decrease in contrast as shown in FIG. 9. In another preferred embodiment of the present invention, it is possible to obtain a large contrast while suppressing the flickering on a display picture by satisfying the relations of:

$$\Delta I_1(=|Ia_1-Ib_1|)<\Delta I_2(=|Ia_1-Ib_2|)$$

wherein $Ia_1$ denotes a time-average transmitted light intensity in at least one orientation state under the application of the alternating electric field; $Ib_1$ denotes a transmitted light intensity in the orientation state under no electric field; $Ia_2$ denotes a time-average transmitted light intensity in the darkest or brightest state under the application of the alternating electric field; and $Ib_2$ denotes a transmitted light intensity in the darkest or brightest state under no electric field.

Figure 5A:
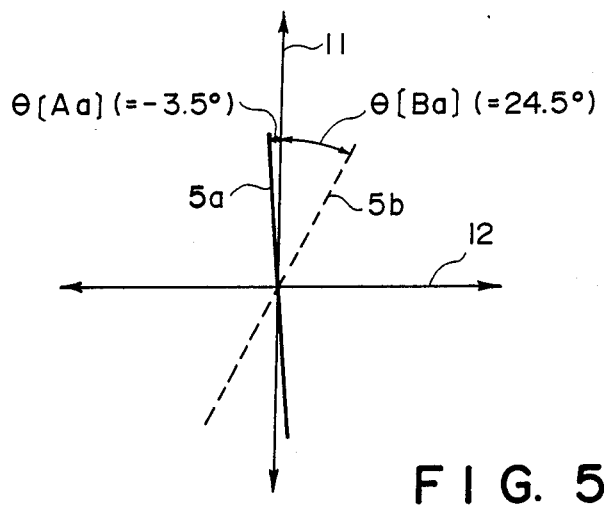
FIG. 5A is a plan view schematically illustrating another ferroelectric liquid crystal device of the present invention.
Figure 5B:
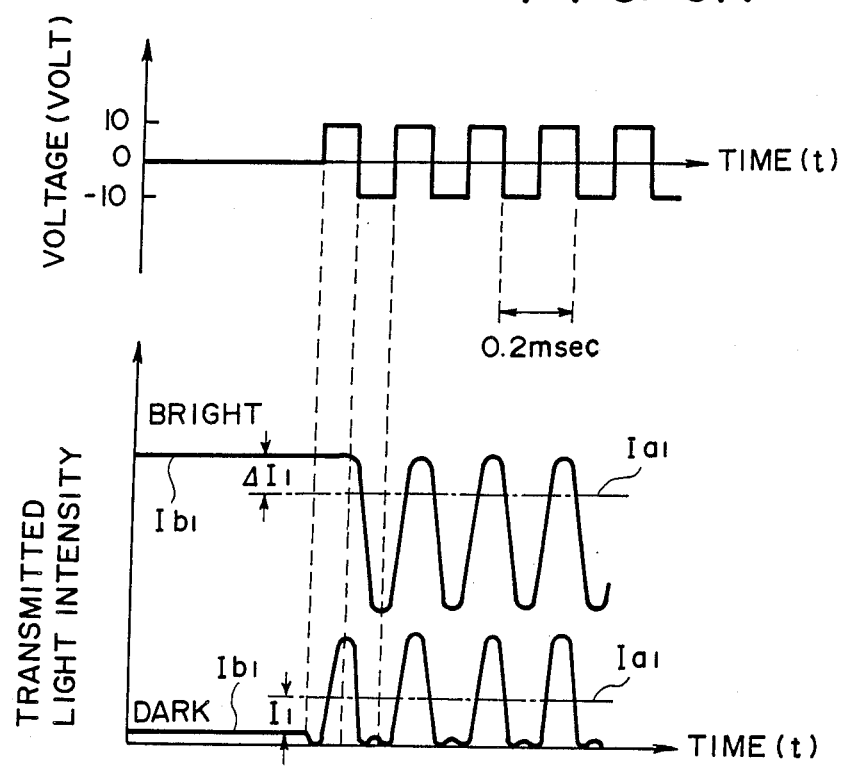
FIG. 5B is an explanatory view showing the optical response characteristics resultant when the device is supplied with an AC voltage below the threshold.

FIG. 5A relates to an embodiment of the present invention and shows the positional relationship among a liquid crystal molecule $5a$ disposed at a position $\theta[Aa]$ of a first orientation state, a liquid crystal molecule $5b$ disposed at a position $\theta[Ba]$ of a second orientation state, and absorption axes 11 and 12 of a pair of polarizers. FIG. 5B shows an optical response characteristic of the liquid crystal device placed in the relative position shown in FIG. 5A when supplied with AC rectangular pulses with a frequency of 5 KHz and a peak value of ±10 V. In the ferroelectric liquid crystal device explained with reference to FIGS. 5A and 5B, the liquid crystal material used was "CS-1011" (trade name, mfd. by Chisso K.K.), and the cell thickness was 1.0 μm.

Figure 12A:
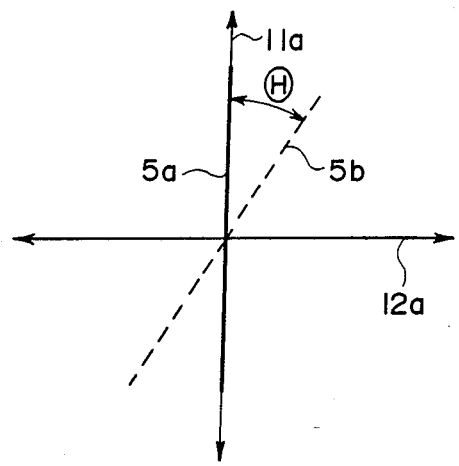
FIG. 12A is a plan view schematically illustrating an optical modulation device outside the present invention.
Figure 12B:
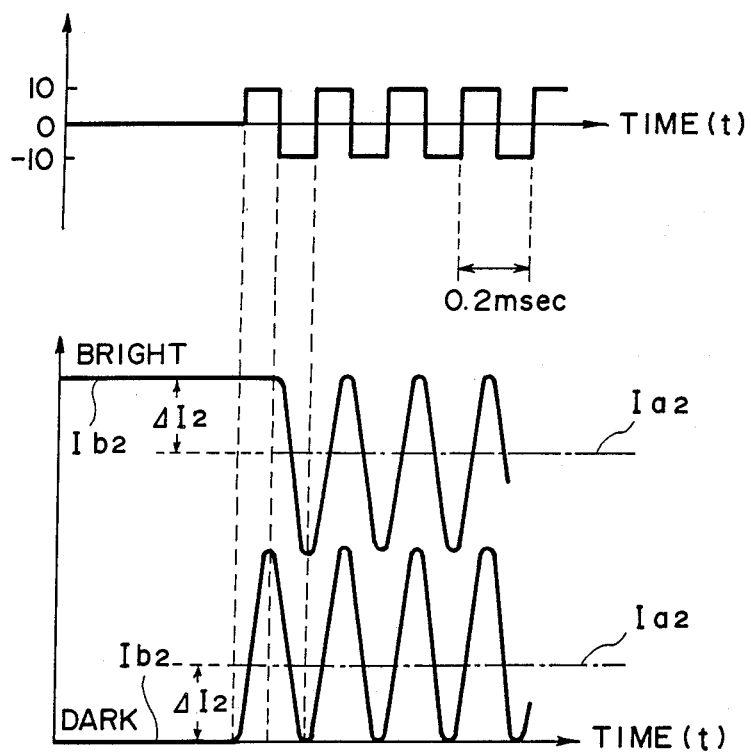
FIG. 12B is an explanatory view showing the optical response characteristics resultant when the device is supplied with an AC voltage below the threshold.

FIG. 6 illustrates an angle of a molecular movement and a corresponding change in transmitted light intensity. Also in the case of FIG. 6, the stable positions under no electric field are denoted by Aa (position of first orientation state) and Ba (position of second orientation state), and the ranges of movement of molecules under the application of an electric field (a pulse with a frequency of 5 KHz and a peak value of ±10, a third of the threshold) are given by Aa→Ab, and Ba→Bb. In this embodiment, the angles $\theta$ were $\theta[Aa]=-3.5°$, and $\theta[Ba]=24.5°$. In other words, in this embodiment, the absorption axes $11a$ and $12a$ shown in FIG. 12A were respectively rotated by $-3.5°$.

Now, the position of the first orientation state $\theta[Aa]$ corresponds to a relatively dark position and the position of the second orientation state $\theta[Ba]$ correspond to a relatively bright position. As the transmitted light intensity varies under the application of an electric field, the average brightness sensed by eyes becomes brighter at the position $\theta[Aa]$ of the first orientation state and darker at the position $\theta[Ba]$ of the second orientation state, respectively compared with those under no electric field. However, the amount of the change $\Delta I$ at that time is smaller at least with respect to the position $\theta[Aa]$ of the first orientation state than at the position shown in FIG. 12A. The reason for this is as follows. In the positional relation shown in FIG. 5A, as is understood from the optical response shown in FIG. 5B, the molecular axis at the position $\theta[Aa]$ of the first orientation state once decreases and then increases the transmitted light intensity under the application of a positive electric field (this is because the optical axis moves across the absorption axis), while the transmitted light intensity under the positional relationship shown in FIG. 12A only increases during the application of a positive electric field. The difference $\Delta I$ at the position $\theta[Ba]$ of the second orientation state does not necessarily become smaller than in the positional relation of FIG.

12A. However, flickering noticeable to eyes is mainly in the dark state, so that an easier-to-see picture is provided when ΔI at the position θ[Aa] of the first orientation state (dark state) is preferentially minimized as is in this embodiment.

FIG. 6 shows the change in transmitted light intensity of the liquid crystal device shown in FIG. 5 with respect to the range of movement of the optic axis. The range of movement of the molecular axis (optic axis) at the position θ[Aa] of the first orientation state is θ[Aa]→θ[Ab], and the range of movement of the molecular axis at the position θ[Ba] of the second orientation state is θBa]θ[Bb]. In this embodiment, θ[Aa] was set to −3.5° and the above mentioned ΔI, was not equal to zero. At this time, the contrast was about 16:1 which was higher than the contrast of about 7:1 obtained under the condition of $\Delta I_1 = 0$.

In the above embodiment, the $\Delta I_1$ in the dark state is preferentially minimized, but it is also possible to preferentially minimize the $\Delta I_1$ in the bright state. FIG. 7 shows such an embodiment wherein the optic axis at the position θ[Ba] in the second orientation state is caused to move across the maximum transmission axis, i.e., an axis forming an angle of 45° from the absorption axis under the application of an electric field. At this time, the transmitted light intensity in the bright state increases and decreases with the light intensity under no electric field at the center of movement, so that the $\Delta I_1$ is minimized.

As described hereinbefore, it is desirable to minimize the change in transmitted light $\Delta I_1$ in the dark state preferentially. However, it is also possible to decrease the $\Delta I_1$ in both the bright and dark states in some cases. FIG. 9 shows such an embodiment wherein a ferroelectric liquid crystal cell containing a liquid crystal of "ZLI 3233" (mfd. by Merck Co.) in a thickness of 1.0μm was used. In this embodiment, the angle between the position θ[Aa] of the first orientation state and the position θ[Ba] of the second orientation state under no electric field is 52°. When the absorption axis is deviated by −3.5° from the optic axis at the position θ[Aa] of the first orientation state, it is possible to provide a condition that under the application of an electric field, not only the optic axis at the position θ[Aa] of the first orientation state moves across the absorption axis, but also the optic axis at the position θ[Ba] of the second orientation state moves across the maximum transmission axis (forming an angle of 45° from the absorption axis). At this time, the transmitted light intensity under the application of an alternating electric field in the directions of both increase and decrease with the light intensity under no electric field at the center of movement in both the first and second orientation states, so that $\Delta I_1$ is decreased in both states.

As will be understood from the above description, in a case where the angle between the optical axes in the first and second orientation states is larger than 45°, the changes in transmitted light intensity $\Delta I_1$ can be decreased in both the bright and dark states by rotating a pair of polarizers while retaining their absorption axes at right angle cross nicols and by setting the absorption axis of a polarizer and the maximum transmission axis forming 45° from the absorption axis to positions each between the two optic axes.

According to the present invention, an easy-to-see display free of flickering on a display picture and with little noticeable change in the quantity of transmitted light between the voltage application time, (i.e., scanning time) and the non-application time (no scanning time) can be provided, and a device therefor can be easily realized by rotating the absorption axis of a polarizer from the darkest state at the time of no electric field application by a certain degree of angle.

What is claimed is:

1. A liquid crystal device, comprising:
   a liquid crystal cell comprising:
     a pair of substrates; and
     a chiral smectic liquid crystal assuming a first and a second orientation state in response to an electric field applied thereto, wherein said chiral smectic liquid crystal is disposed between said pair of substrates in a layer sufficiently thin to release its helical structure when no electric field is applied thereto; and
   optical means for receiving the light from said chiral smectic liquid crystal,
   wherein the time-average transmitted light intensity therethrough in either orientation state under the application of an alternating electric field having a time-average of zero not causing a transition between the first and second orientation states is substantially equal to the transmitted light intensity in either orientation state under no electric field.

2. A liquid crystal device, comprising:
   a liquid crystal cell comprising:
     a pair of substrates; and
     a chiral smectic liquid crystal assuming a first and a second orientation state in response to an electric field applied thereto, wherein said chiral smectic liquid crystal is disposed between said pair of substrates in a layer sufficiently thin to release its helical structure when no electric field is applied thereto; and
   optical means for receiving the light from said chiral smectic liquid crystal,
   wherein said liquid crystal device satisfies the following relations:

$$\Delta I_1 \equiv |Ia_1 - Ib_1| < \Delta I_2 \equiv |Ia_2 - Ib_2|,$$

wherein $Ia_1$ denotes a time-average transmitted light intensity in either orientation state under the application of an alternating electric field having a time average of zero not causing a transition between the first and second orientation states; $Ib_1$ denotes a transmitted light intensity in one of the orientation states under no electric field; $Ia_2$ denotes a time-average transmitted light intensity in the darkest or brightest state of said chiral smectic liquid crystal under the application of the alternating electric field; and $Ib_2$ denotes a transmitted light intensity in the darkest or brightest state of said chiral smectic liquid crystal under no electric field.

3. A liquid crystal device comprising:
   a liquid crystal cell comprising:
     a pair of substrates; and
     a chiral smectic liquid crystal assuming a first and a second orientation state in response to an electric field applied thereto, wherein said chiral smectic liquid crystal is disposed between said pair of substrates in a layer sufficiently thin to release its helical structure when no electric field is applied thereto; and
   optical means comprising a polarizer and an analyzer, wherein the absorption or transmission axes of said polarizer and said analyzer are disposed to intersect each other and deviate from the optic axes of said liquid crystal device along which the darkest and brightest states of the liquid crystal device are displayed.

4. A liquid crystal device according to claim 3, wherein the absorption or transmission axes of said polarizer and said analyzer intersect each other at tight angles.

5. A liquid crystal device according to claim 3, wherein movement of the optic axis occurs in response to applying to said chiral smectic liquid crystal oriented to one of the first and second orientation states an alternating electric field having a time-average of zero not causing a transition between the first and second orientation states, and wherein movement of the optic axis occurs in response to applying the alternating electric field to said chiral smectic liquid crystal oriented to the other of the first and second orientation states wherein both optic axis movements occur across the absorption axis of said polarizer or said analyzer or across an axis forming an angle of 45° from the absorption axis.

6. A liquid crystal device according to claim 3, wherein two optic axes based on the first and second orientation states under no electric field form an angle of at least 45°.

7. A liquid crystal device according to claim 3, wherein the absorption axis of said polarizer or said analyzer or an axis forming an angle of 45° from the absorption or axis is located between two optic axes based on the first and second orientation states of said chiral smectic liquid crystal under no electric field.

8. A liquid crystal device according to claim 3, wherein said alternating electric field is generated by an AC voltage.

9. A liquid crystal device comprising:
a liquid crystal cell comprising:
  a pair of substrates; and
  a chiral smectic liquid crystal assuming a first and a second orientation state in response to an electric field applied thereto, wherein said chiral smectic liquid crystal is disposed between said pair of substrates in a layer sufficiently thin to release its helical structure when no electric field is applied thereto; and
optical means comprising a polarizer and an analyzer, wherein the absorption or transmission axes of said polarizer and said analyzer are disposed to intersect each other and deviate from the optic axis of said liquid crystal device along which the darkest or brightest state of the liquid crystal device is displayed, wherein movement of the optic axis occurs in response to applying to said chiral smectic liquid crystal, oriented to one of the first and second orientation states, an alternating electric field having a time-average of zero not causing a transition between the first and second orientation states, and wherein movement of the optic axis occurs in response to applying the alternating electric field to said chiral smectic liquid crystal, oriented to the other of the first and second orientation states, and wherein both optic axis movements occur across the absorption or transmission axis of said polarizer or said analyzer or across an axis forming an angle of 45° from the absorption or transmission axis.

10. A liquid crystal device comprising:
a liquid crystal cell comprising:
  a pair of substrates; and
  a chiral smectic liquid crystal assuming a first and a second orientation state in response to an electric field applied thereto, wherein said chiral smectic liquid crystal is disposed between said pair of substrates in a layer sufficiently thin to release its helical structure when no electric field is applied thereto; and
optical means comprising a polarizer and an analyzer, wherein the adsorption or transmission axes of said polarizer and said analyzer are disposed to intersect each other and deviate from the optic axis of said liquid crystal device along which the darkest or brightest state of the liquid crystal device is displayed, wherein movement of the optic axis occurs in response to applying to said chiral smectic liquid crystal oriented to one of the first and second orientation states an alternating electric field having a time-average of zero not causing a transition between the first and second orientation states, and wherein said optic axis movement occurs across the absorption or transmission axis of said polarizer or said analyzer or across an axis forming an angle of 45° from the absorption transmission axis.

11. A liquid crystal device according to claim 10, wherein two optic axes based on the first and second orientation states under no electric field form an angle of at least 45°.

12. A liquid crystal device according to claim 10, wherein the absorption or transmission axis of said polarizer or said analyzer or an axis forming an angle of 45° from the absorption or transmission axis is located between two optic axes based on the first and second orientation states of said chiral smectic liquid crystal under no electric field.

13. A liquid crystal device according to claim 10, wherein said alternating electric field is generated by an AC voltage.

* * * * *

UNITED STATES PATENT AND TRADEMARK OFFICE
CERTIFICATE OF CORRECTION

PATENT NO. : 4,878,740

DATED : November 7, 1989

INVENTOR(S) : YUTAKA INABA ET AL.

It is certified that error appears in the above-identified patent and that said Letters Patent is hereby corrected as shown below:

COLUMN 1

Line 42, "equation" should read --equation.--.
    Line 46, "$I=I_0 \sin^2 2\theta \cdot \sin^2(\pi \cdot \Delta n \cdot d/\lambda$   (1)" should read
          --$I=I_0 \sin^2 2\theta \cdot \sin^2(\pi \cdot \Delta n \cdot d/\lambda)$   (1)--.

COLUMN 2

Line 3, "therefor" should read --this--.
    Line 15, "little" should be deleted.
    Line 62, "an" should read --and--.

COLUMN 3

Line 22, "time-averate" should read --time average--.

COLUMN 4

Line 37, "a under" should read --under a--.

COLUMN 5

Line 3, "moment (P_)4" should read --moments (P_)4--.
    Line 15, "(e.g, 1" should read --(e.g., 1--.
    Line 27, "o" should read --or--.

COLUMN 8

Line 6, "$\Delta I_1 (\equiv |Ia_1 - Ib_1|) < \Delta I_2 (\equiv |Ia_1 - Ib_2|)$" should read
          --$\Delta I_1 (\equiv |Ia_1 - Ib_1|) < \Delta I_2 (\equiv |Ia_2 - Ib_2|)$--.
    Line 12, "$Ia_2$denotes" should read --$Ia_2$ denotes--.
    Line 46, "correspond" should read --corresponds--.

UNITED STATES PATENT AND TRADEMARK OFFICE
CERTIFICATE OF CORRECTION

PATENT NO. : 4,878,740
DATED : November 7, 1989
INVENTOR(S) : YUTAKA INABA ET AL.

Page 2 of 2

It is certified that error appears in the above-identified patent and that said Letters Patent is hereby corrected as shown below:

COLUMN 9

Line 13, "$\theta Ba]\theta[Bb]$." should read --$\theta[Ba]\rightarrow\theta[Bb]$.--.
Line 20, "$\triangle I_1 in$" should read --$\triangle I_1$ in--.

COLUMN 11

Line 8, "tight" should read --right--.
Line 22, "absorption axis." should read
--absorption or transmission axis.--.
Line 30, "or axis" should read --or transmission axis--.

COLUMN 12

Line 24, "adsorption" should read --absorption--.
Line 38, "absorption transmission axis." should read
--absorption or transmission axis.--.

Signed and Sealed this

Twelfth Day of November, 1991

*Attest:*

HARRY F. MANBECK, JR.

*Attesting Officer*  *Commissioner of Patents and Trademarks*